Aug. 17, 1965  D. C. IVY  3,200,889
APPARATUS FOR FARM CULTIVATING AND HARVESTING
Filed Jan. 28, 1964  5 Sheets-Sheet 1

INVENTOR.
Daniel C. Ivy
BY
ATTORNEYS

Aug. 17, 1965    D. C. IVY    3,200,889
APPARATUS FOR FARM CULTIVATING AND HARVESTING
Filed Jan. 28, 1964    5 Sheets-Sheet 2
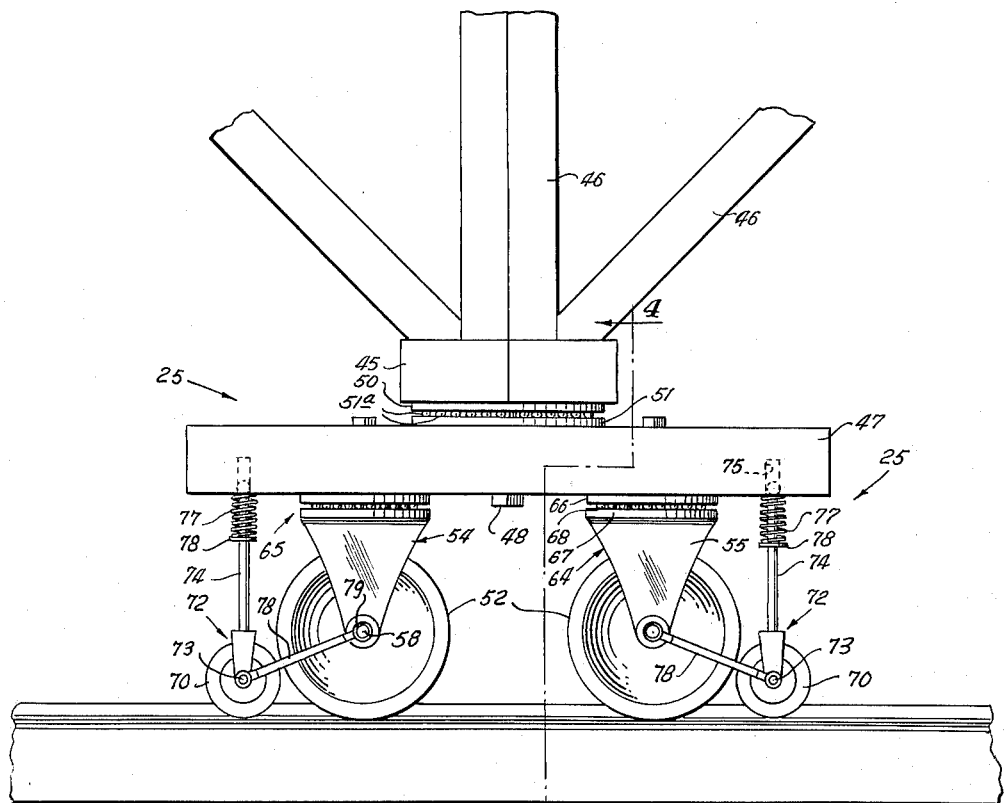
Fig. 3
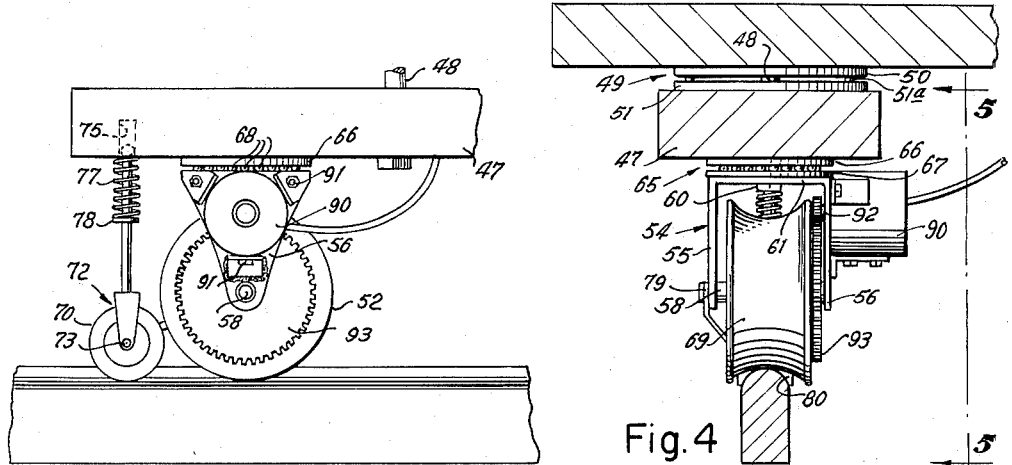
Fig. 5
Fig. 4
INVENTOR.
Daniel C. Ivy
ATTORNEYS Aug. 17, 1965     D. C. IVY     3,200,889
APPARATUS FOR FARM CULTIVATING AND HARVESTING
Filed Jan. 28, 1964     5 Sheets-Sheet 3

INVENTOR.
Daniel C. Ivy
ATTORNEYS

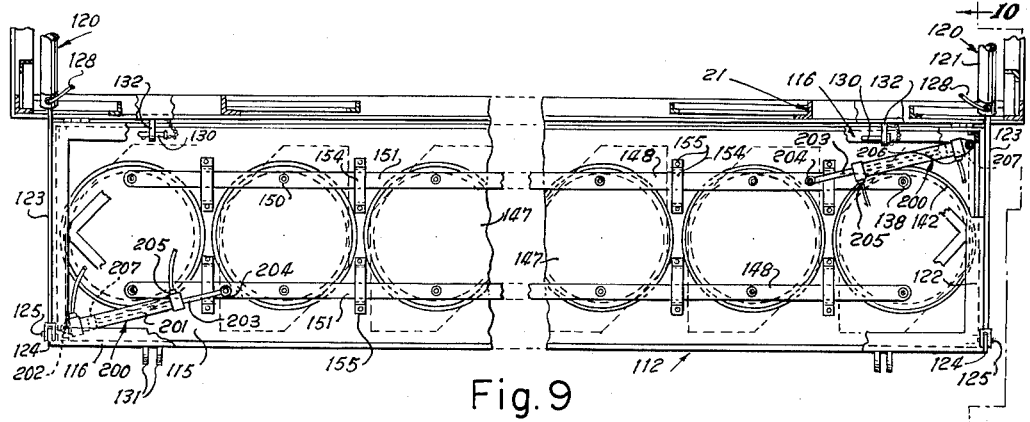
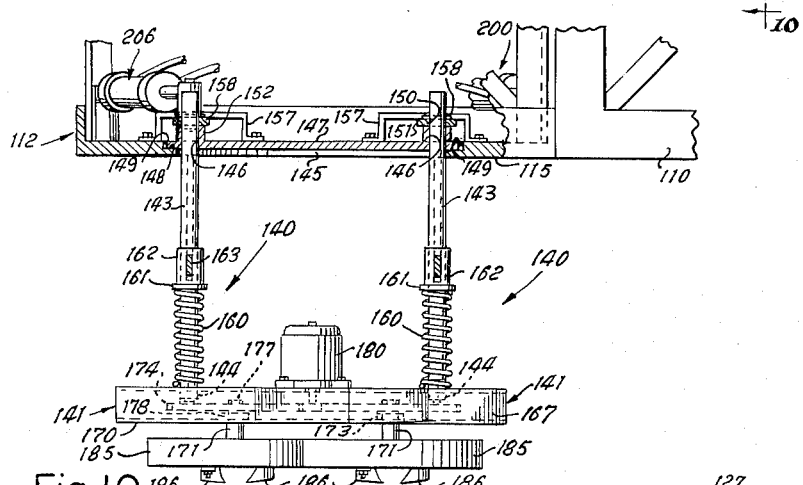
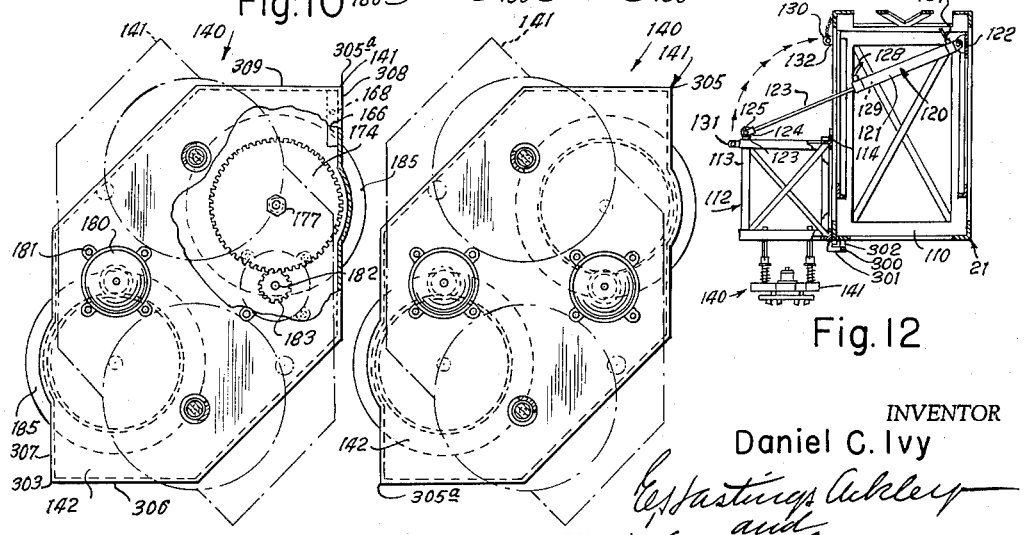

Aug. 17, 1965   D. C. IVY   3,200,889
APPARATUS FOR FARM CULTIVATING AND HARVESTING
Filed Jan. 28, 1964   5 Sheets-Sheet 5

INVENTOR
Daniel C. Ivy
BY
ATTORNEYS

United States Patent Office 3,200,889
Patented Aug. 17, 1965

3,200,889
APPARATUS FOR FARM CULTIVATING
AND HARVESTING
Daniel C. Ivy, Amagon, Ark.
Filed Jan. 28, 1964, Ser. No. 340,740
10 Claims. (Cl. 172—26)

This invention relates to farm machines.

An object of the invention is to provide a new and improved machine movable in a predetermined path over a large tract of land and on which implements are mountable for treating or working the earth, while the crop is planted and while the crop is growing, and for treating the crops themselves with insecticides or the like.

An other object is to provide a machine which is movable in a predetermined path over a tract of land and which has mount means on which implements may be mounted for working or treating the earth as the machine moves thereover in the predetermined path.

Another object is to provide a farm machine of the type described having a triangular support or base frame provided with wheel means at its three corners or apices whereby the frame is movable on parallel tracks with the wheel means at one of the apices supporting the base frame on the inside track at the curved portions of the tracks and the wheel means at the other two apices of the base frame supporting the machine on the outside track at such curved portions of the tracks.

A further object is to provide a machine of the type described wherein the wheel means at the three apices of the frame are provided with individual drive means whereby the speed of rotation of the wheel means at the different apices may be varied as required during the movement of the machine along curved portions of the tracks.

A still further object is to provide a machine wherein the triangular base frame is provided with extensions extending in opposite directions outwardly of the two tracks whereby the full area of the tract of land on which the parallel tracks extend may be worked by implements mounted on the base frame.

A still further object is to provide a machine of the type described which is provided with drive means for driving the machine over the tracks and driving the implements mounted thereon.

Another object is to provide a machine having mount means for implements secured to the base frame which includes a mount frame which is movable relative to the base frame to facilitate the installation and inspection of implements thereon.

Still another object is to provide a new and improved earth working implement assembly wherein the plows or other implements of the assembly are movable relative to each other to vary the widths of the strips of earth worked thereby during the movement of the machine along the tracks whereby the implements may work the full area of the tract of land or only the strips or areas of earth between rows of crops.

Additional objects and advantages of the invention will be readily apparent from the reading of the following description of a device constructed in accordance with the invention, and reference to the accompanying drawings thereof, wherein:

FIGURE 3 is a fragmentary side view of one of the wheel means of the machine;

FIGURE 4 is a sectional view taken on line 4—4 of FIGURE 3;

FIGURE 5 is a sectional view taken on line 5—5 of FIGURE 4;

FIGURE 9 is a sectional view, with some parts broken away, taken on line 9—9 of FIGURE 7;

FIGURE 10 is a sectional view, with some parts broken away, taken on line 10—10 of FIGURE 9;

FIGURE 11 is a sectional view taken on line 11—11 of FIGURE 7;

FIGURE 12 is a vertical, partly sectional view, showing the pivotal mounting of the implement mount frame on the base frame of the machine;

Figure 1:
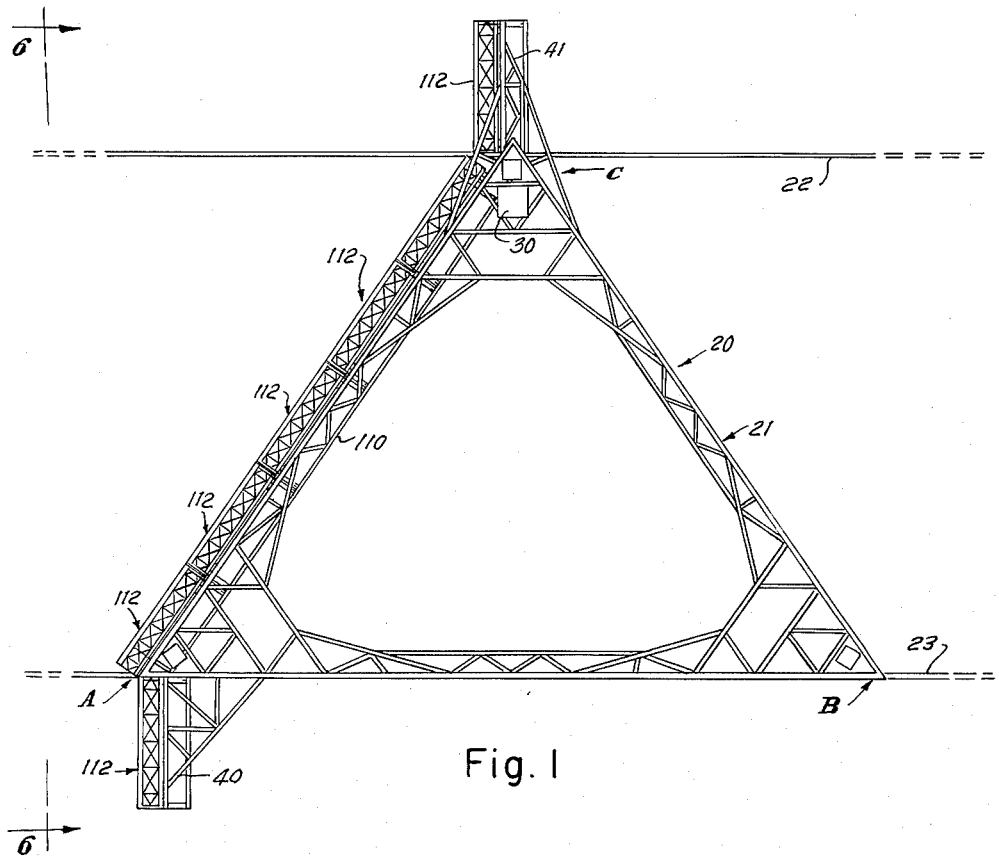
FIGURE 1 is a schmatic top view of a farm machine embodying the invention.
Figure 2:
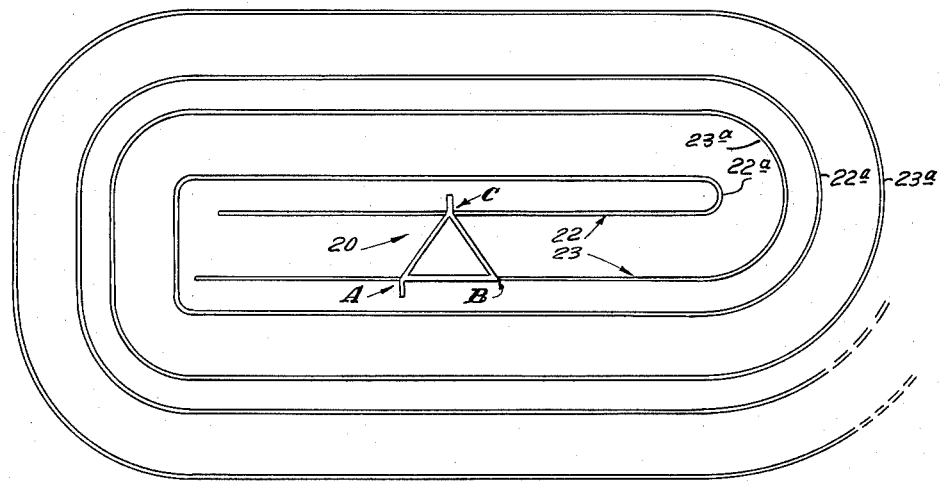
FIGURE 2 is a schematic top view of a tract of land having a pair of parallel tracks extending thereover on which the machine is movable.
Figure 6:
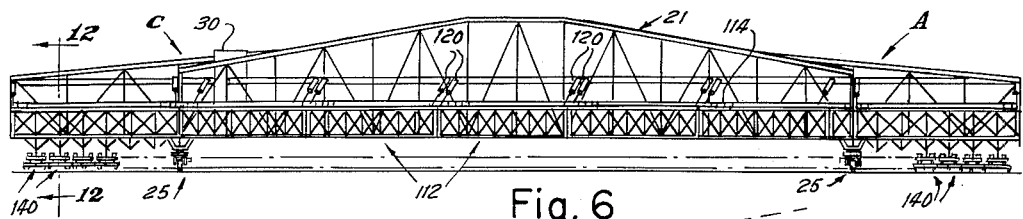
FIGURE 6 is a schematic view taken on line 6—6 of FIGURE 1.
Figure 7:
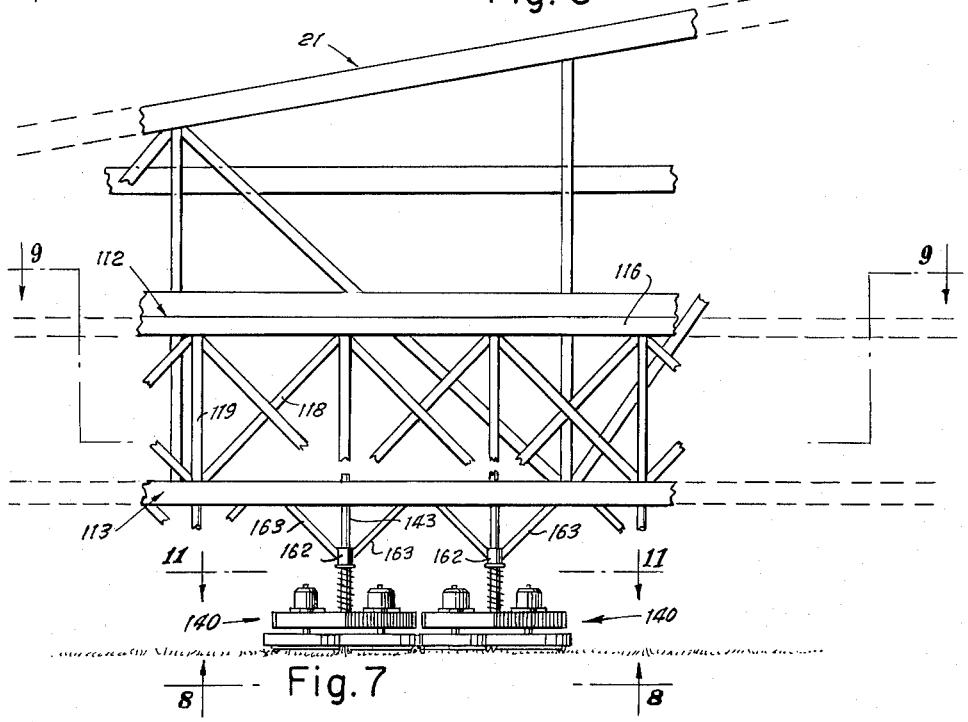
FIGURE 7 is a fragmentary enlarged view, with some parts broken away, of an implement assembly of the machine.

Referring now to the drawings, the farm machine 20 includes a triangular support or base frame 21 mounted for movement along the parallel tracks 22 and 23 by means of wheel assemblies 25 secured to the frame at the corners or apices A, B and C thereof. The base frame 21 may be of a suitable truss structure providing the necessary rigidity and spanning the relatively great distances between the wheel assemblies. For example, the distance between the wheel assemblies at the corners A and C may be more than 200 feet. The base frame at one corner, for example, the corner C, may have mounted thereon an enclosed cab or housing 30 in which a prime mover such as a diesel motor 31, an electric generator 32 and a compressor motor 33, as well as the various valves and switches of the pneumatic and electric systems of the machine, may be mounted for easy access by the operator. The base frame at its corners A and C is provided with extensions 40 and 41 which extend in opposite directions outwardly of the tracks 22 and 23, respectively, for a purpose to be described below.

Referring now particularly to FIGURES 3, 4 and 5 of the drawings, each of the wheel mounts 25 includes a horizontal support plate 45 rigidly secured to the base frame by any suitable support means or members 46. A rotatable plate 47 is secured to the support plate by means of a bolt 48 which extends through suitable apertures in the plates 45 and 47. A ball bearing assembly 49 is interposed between the plates 45 and 47 and may include an upper race 50, a lower race 51 and ball bearings 51a interposed therebetween in the usual manner. Two load bearing wheels 52 are secured to each rotatable plate 47 in any suitable manner, as by U-shaped brackets 54 whose arms 55 and 56 extend on opposite sides of the load wheels. Each load wheel is rotatably secured to the bracket arms by means of a shaft 58 which extends through suitable aligned apertures in the wheel and the bracket arms. Each bracket 54 is rotatably secured to the rotatable plate 47 for rotation about a vertical axis by a pivot bolt or shaft 60 which extends through suitable bores in the horizontal top portion 61 of the wheel bracket and the rotatable plate 47. A ball bearing assembly 65 is interposed between the plate 47 and the top bracket portion 61 and may include an upper race 66, a lower race 67 and ball bearings 68 interposed therebetween.

The peripheral outer surfaces 69 of the load wheels 52 are of considerably greater radius of curvature than the curvature of the top surface or tread of the track on which they are rollable so that the load wheels may shift slightly laterally on the tracks as required to compensate for any nonuniformity in the spacing of the tracks. To insure that each load wheel remains on its tracks as the machine moves over the tracks, a guide wheel 70 is provided therefor. Each guide wheel is rotatably mounted on a bifurcated bracket 72 by means of a shaft 73. The guide wheel bracket is provided with an upwardly extending rod 74 which extends into a suitable vertical bore of the rotatable plate 46. The bore 75 of the rotatable plate is of somewhat greater diameter than the rod 74 to permit limited lateral movement of the rod relative to the rotatable plate. The bracket 72 is biased downwardly by a spring 77 disposed on the rod 74 with its lower end abutting the external annular washer of flange 78 rigid with the rod and with its upper end engaging the lower surface of the rotatable plate 47. The bracket 54 of each load wheel 52 is connected to the bracket 72 of its guide wheel by a link 78 whose opposite ends are provided with apertures through which the shafts 58 and 73 of the load and guide wheels extend. The link is secured against displacement from the shaft by suitable lock rings 79, or in any other suitable manner.

Each guide wheel 70, which is biased downwardly against the upper surface of the track and the curvature of whose peripheral surface 80 conforms to the curvature of the top surface or tread of the tracks causes its load wheel and its bracket to pivot about its shaft 74 to ensure that the load wheels remain at all times on the tracks. The radius of any curved sections of the tracks, as at 22a or 23a, is great as compared to the distance separating each guide wheel and its load wheel and therefore very little lateral movement of each guide wheel relative to its load bearing wheel will take place and any such lateral movement is accommodated by the loose fit of the guide wheel bracket rod 74 in its bore 75.

One or more of the load wheels 52 of each wheel assembly 25 is driven by an electric motor 90 rigidly secured to the arm 56 of the bracket 54 of the load wheel in any suitable manner, as by the bolts 91. The drive shaft of each motor 90 is provided with a small gear 92 which meshes with the large gear 93 rigid with the load wheel. It will be apparent that when the motor of a particular load wheel is energized, the rotation of its drive shaft will cause rotation of the load wheel.

It will be apparent that when the machine moves along parallel curved sections, such as at 22a and 23a, of the tracks 22 and 23, the wheels at the corners A and B of the machine move along the outside curved section 32 of the tracks 23 of greater radius of curvature than the parallel curved section 22a along which move the wheels at the corner C of the machine. The wheels at the corners A and B of the machine must necessarily rotate at a greater speed than the wheels at the corner C of the machine. This is easily accomplished by suitable controls provided for the electric motors of the wheels at the three corners. If desired, the speed of rotation of the load wheels at the three corners may be varied by suitable control means located in the cab or housing structure 30 of the machine whereby the operator of the machine may manually adjust the speed of the load wheels. It will thus be apparent that the machine 20 may be caused to move along the track at a substantially constant speed and that the speed of rotation of the wheels at the corners C and the corners A and B as the machine moves over the curved sections of the tracks is varied to cause the side 110 of the frame between the corners A and C to maintain a constant angle relative to the tracks at each location of its path of movement along the tracks.

The side 110 of the main frame 26 of the machine and the extensions 40 and 41 have a plurality of implement assembly sections 112 mounted thereon. Each of the implement assembly sections includes a substantially rectangular frame 113 connected to the side 110 of the base frame 21 or to the extensions for pivotal movement by means of any suitable hinges 114. Each of the frames 113 may be of rectangular truss structure type and include a bottom horizontal longitudinally extending plate 115 and an upper rectangular frame 116 formed of angle iron, the rectangular frame being connected to the bottom frame by the usual diagonal and vertical frame truss members 118 and 119, respectively.

Each implement assembly section 112 is movable through ninety degrees about the horizontal axis of its hinges between the horizontal operative position illustrated in the drawings and an upper inoperative position by means of two or more pneumatic rams 120. Each pneumatic ram includes a cylinder 121 whose closed end is pivotally connected to the base frame, as by a pivot pin or shaft 122, and whose piston rod 123, which extends outwardly of the other end of the cylinder, has its lower end connected to a lug 124 of the frame 113 by a suitable pivot pin 125 which extends through aligned apertures in the lug 124 and the piston rod.

Each cylinder is provided with upper and lower fittings 127 and 128 through which fluid, such as air under pressure may be introduced into and exhausted from the cylinder on either side of the piston 129 slidable therein. It will be apparent that when fluid under pressure is introduced into the lower fittings 128 of the cylinders 121 while the upper fittings are vented to the atmosphere, the piston rods 123 are retracted into the cylinders to move the frame 113 pivotally upwardly about its hinges 114 to a position wherein the upper rectangular frame 116 is vertical and adjacent the base frame. Each frame 113 is rigidly securable to the base frame in its upper position by suitable pins 130 which may extend through the lugs 131 and 132 of the frame 113 and the side 110, respectively. Each frame 113 may, of course, be lowered to its lower operative position illustrated in FIGURE 10 by removing the pin 130 from the apertures of the lugs 131 and 132 and then venting the ram cyclinders to the atmosphere through the fittings 128 at a controlled rate to control the rate of downward pivotal movement of the frame 113.

Each implement assembly section carries a plurality of implements, such as the illustrated plow assemblies 140 mounted on the bottom plate 115 of its frame 113. Each plow assembly includes a gear housing 141 whose top wall 142 has a pair of suitable apertures through which extend the lower reduced end portions of two vertical support posts 143 which are secured to the top wall in any suitable manner as by nuts 144 threaded on the lower reduced end portions. The posts of each plow assembly extend upwardly through one of the plurality of circular apertures 145 of the bottom plate 115 and through the apertures 146 in a support disc 147 which rests slidably on the upwardly facing annular support shoulder 148 of the base plate provided by the upper enlarged portion of the circular aperture 145 which also provides a vertical annular shoulder 149 which limits horizontal movement of the support disc 147. The upper ends of the two posts 143 also extend slidably through apertures 150 of the adjusting bars 151 which rest on the top annular end shoulders or surfaces of the upwardly extending bosses 152 of the support disc. Upward movement of the adjusting bars 151 is limited by the U-shaped brackets 154 rigidly secured to the bottom plate in any suitable manner, as by the screws 155. Downward movement of the posts is limited by the pins 158 secured to their upper ends which extend outwardly of the post and engage the adjusting bars.

The support posts, and therefore the housing of each plow assembly, are biased downwardly by springs 160 disposed about the posts whose lower ends bear against the top wall of the gear housing and whose upper ends engage the bottom surface of an annular flange 161 of a collar 162 rigidly connected to the base plate by means of the upwardly divergent supports bars 163. Each plow housing is, therefore, movable upwardly against the yielding force exerted by the biasing springs 160.

The top wall rests on and is rigidly secured to a horizontal flange 166 of the vertical continuous wall 167 of the housing in any suitable manner, as by the bolts or screws 168.

The bottom wall of the wall 170 of the housing 141, which is integral with the vertical side wall 167, has suitable apertures through which extend rotatably the plow shafts 171 whose upwardly facing annular shoulders 173 limit upward movement of the plow shafts. Large gears 174 disposed in the housing are rigidly secured to the plow shafts in any suitable manner. For example, an intermediate upper end portion of each plow shaft may be of non-circular cross-sectional configuration, for example, square, and each large gear may be provided with a central aperture of similar configuration whereby the gears are non-rotatably mounted on the shafts. The gears may be rigidly secured to the shaft by nuts 177 threaded on the upper reduced end portions of the plow shafts. The large gears 174 are held properly spaced from the bottom wall by means of spacer washers 178 disposed about the shafts and between the bottom housing wall and the gears. Each of the large gears is driven by a motor 180 rigidly secured to the top wall 142 of the housing, as by the bolts 181, whose drive shaft 182 extends downwardly through a suitable aperture in the top wall 142 into the housing and is provided with a small gear 183 which meshes with the large gear 174 of its associated plow shaft.

Figure 8:
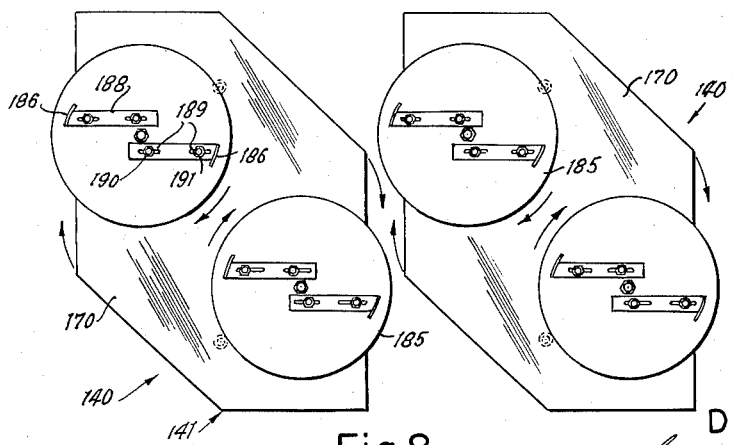
FIGURE 8 is a fragmentary enlarged view taken on line 8—8 of FIGURE 7.
Figure 13:
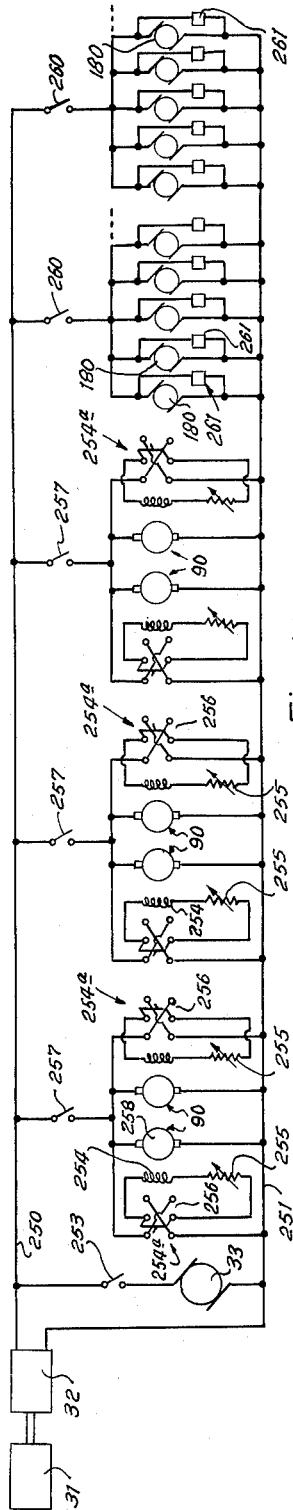
FIGURE 13 is a schematic diagram of the electric drive and control system of the machine.

Each of the plow shafts 171 has a solid fly wheel or disk 185 rigidly secured thereto. A pair of plow knives 186 are rigidly secured to the fly wheel. Each of the plow knives has an integral flat bar 188 provided with elongated slots 189 through which extend bolts 190 rigid with the fly wheel. Nuts 191 threaded on the studs 190 secure the knives in any adjusted position relative to the fly wheels. The plow knives 186 of each fly wheel are curved arcuately inwardly at their forward edges about centers of curvatures displaced from the axis of rotation of the fly wheel so that the knives not only cut through the earth as the fly wheel rotates but also displace and move the earth engaged thereby. The two wheels of each plow assembly 140 are rotated in opposite directions, as indicated in FIGURE 8, to balance the torsional forces to which the housing 141 and therefore the two support posts 143 are subjected during the operation of the plow assemblies as the plow knives engage and work the earth.

The housings of the implement assembly section are rotatable between the full line position, shown in FIGURE 11, wherein the circles described by the knife plows 186 during their rotation overlap in the direction of movement of the machine and the positions illustrated in broken lines in FIGURE 11, wherein the fly wheels of each plow assembly are in alignment in the direction of movement of the machine and the plow knives of adjacent pairs of plow assemblies plow or work narrow strips of earth whereby the plow assemblies may plow or work the strips of earth between rows of crops.

The plow assemblies are movable between their two extreme positions by pneumatic rams 200 whose cylinders 201 are pivotally secured to the frame, as at 202, and whose piston rods 203 are pivotally secured, as by pins 204, to the adjusting bars 151. Each cylinder has fittings 205 and 206 at its opposite ends through which air may be introduced into or exhausted from the cylinder on opposite sides of the piston 207 to which the piston rod is secured. It will be apparent that when air under pressure is introduced into the cylinders 201 through the fittings 206 while the clinders are vented to the atmosphere through the fittings 205, the pistons 203 are moved toward their extended positions causing the support disks 147 of the implement assembly section to be rotated in a counter clockwise manner by the adjusting bars, FIGURE 9, to move each plow assembly from one extreme position shown in full line in FIGURE 11, toward its other extreme position shown in broken lines in FIGURE 11. Conversely, if air under pressure is introduced to the cylinders 201 through the inlet fittings 205 while the fittings 206 are vented to the atmosphere, the piston rods 203 are moved toward their fully retracted positions and the plow assemblies are moved toward the extreme position illustrated in full line in FIGURE 11. It will thus be seen that by moving and maintaining the adjusting bars in predetermined positions relative to the base plate, the widths of the strips of earth engaged or worked by the plow knives may be varied as desired.

The electric motors 90 which drive the load wheels of the machine, the electric motors 180 which drive the fly wheels 185 of the plow assemblies 140 and the compressor motor 133 are connectable across the output or main connector 250 and 251 of the generator 32 through suitable control means. For example, the motor 33 which drives the compressor of the pneumatic system of the machine is connectable across the main conductors by means of the switch 253. The motors 90 which drive the load bearing wheels are of a variable speed reversible type. For example, the motors 90 may be direct current shunt motors and each have field windings 254 which are connectable across the main conductors by a control means 254a which may include a variable resistance or rheostat 255, a current reversing switch 256, and the switch 257. The armature winding 258 of each motor 90 is also connectable across the main conductors 250 and 251 by the switch 257. The three switches 257 may be mechanically interconnected and the reversing switches 256 may also be mechanically interconnected for simultaneous actuation so that all wheel driving motors will be simultaneously placed in operation and in the proper direction of rotation. The speed of each motor 90 is, of course, controllable by its rheostat 255.

The motors 180 of each implement section 112 are connectable simultaneously across the main conductors 250 and 251 by switches 260. Each of the motors 180 may also be of the direct current shunt type and be provided with control means 261, identical to the control means 254a of the motors 90, by means of which the speed of rotation and the direction of rotation of the motors 180 may be controlled.

Figure 14:
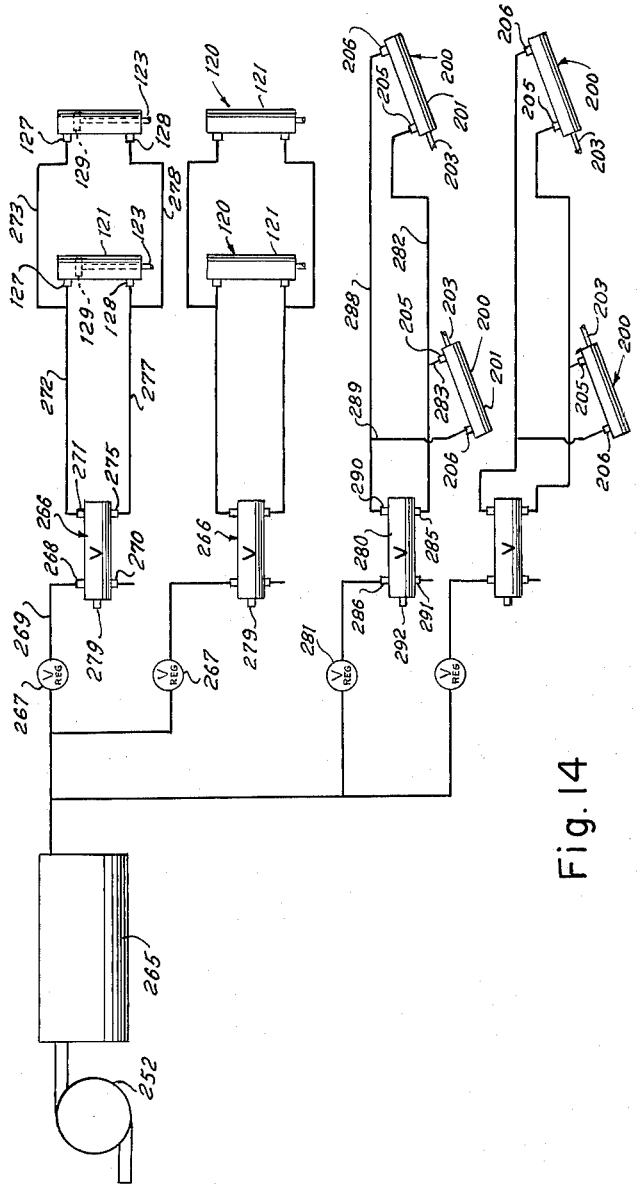
FIGURE 14 is a schematic diagram of the pneumatic system of the farm machine.

Referring now particularly to FIGURE 14 which schematically illustrates the pneumatic system of the machine, the air compressor 252 which is driven by the electric motor 33 when the latter is connected across the main conductors 250 and 251 by the switch 257, pumps air into a reservoir or accumulator 265. The fittings 127 and 128 of the cylinders 121 of the rams 120 of each implement assembly section are connectable selectively to the atmosphere and to the accumulator 265 through a four-way valve 266 and a pressure regulator valve 267. The inlet fitting 268 of the four-way valve is connected to the accumulator tank 265 through the conduit 269 in which the pressure regulator valve 267 is connected. The four-way valve 266 also has a fitting 270 which opens to the atmosphere. The fitting 271 of the valve is connected to the fittings 127 of the cylinders 121 of the rams 120 of its associated implement assembly section by means of the conductors 272 and 273 while its fitting 275 is connected to the other fittings 128 of the cylinders through the conductors 277 and 278. The four-way valves 266 may be of any suitable commercially available type having a suitable manual operator member 279 which when moved to one operative position permits the flow of compressed gas from the inlet fitting 268 to the fitting 271 and simultaneously connects the fitting 275 to the vent fitting 270 so that air under pressure is directed thereby to the inlet fittings 127 of the rams 120 whose operation it controls while simultaneously the fittings 128 thereof are vented or connected to the atmosphere thereby. In the other operative position of its operator member 279, the four-way valve connects its inlet fitting 268 to the fitting 275 and simultaneously connects its fitting 271 to its vent fitting 270 so that air under pressure is transmitted to the fittings 128 of the cylinders 121 and the fittings 127 thereof are simultaneously vented to the atmosphere.

The fittings 205 and 206 of the cylinders 201 of the rams 200 of each implement assembly section 112 are similarly connectable selectively to the atmosphere and to the accumulator 265 through four-way valves 230 and pressure regulator valves 281. The fittings 205 of the cylinders 200 of each implement assembly section are simultaneously connected to the accumulator through the conduits 282 and 283, the fittings 285 and 286 of the valve and the pressure regulator valve 281 while the fittings 206 are simultaneously connected to the atmosphere by means of the conduits 288 and 289 and the fittings 290 and 291 of the four-way valve when the operator member 292 of the four-way valve member is one operative position. Conversely when the operator member 292 of such valve 280 is in its other operative position, the fittings 206 of the cylinders are connected to the accumulator through the conduits 288 and 289, the fittings 290 and 286 of the four-way valve while the fittings 205 of the cylinder are connected to the atmosphere through the conduits 282 and 283 and the fittings 285 and 291 of the four-way valve.

In use, when it is desired to till or work the earth of the tract of land over which the pair of parallel tracks 22 and 23 extend, such implements as the plow assemblies 140 are secured to the frames 113 of the implement assembly sections 112. The implement assembly sections may be held in their lower operative positions by the pressure of the air introduced into the cylinders 121 of their rams 120 through their fittings 127 while their fittings 128 are vented to the atmosphere by means of their four-way valves 266. Alternatively, the frames 113 of the implement assembly sections may be secured in their lower positions in any manner, as by means of the pins 300 which may extend through suitable aligned apertures in the lugs 301 and 302 of the frames 113 and the machine base frame 21, respectively. The plow assemblies 140 may then be moved to any desired relationship relative to each other about the vertical axes of rotation of the support disks 147 by means of the control valves 280 which control the rams 200 which move the adjusting bars 151. For example, if it is desired to plow the whole area of the earth between the tracks as the machine rolls thereover, the plow assemblies are moved to the positions wherein the areas of the earth worked by the plow knives overlap, as illustrated in FIGURE 11. The switch 260 and the control means 261 of the motors 180 of each implement assembly 112 are then operated to place the fly wheels 185 of the plow assemblies 140 in rotation in desired directions and at desired speeds. The switches 257 and the reversible switches 256 of the control means 254a of the motors 90 are operated to cause the motors 90 to rotate the load bearing wheels of the machine to cause the machine to move along the tracks in a desired direction. As the machine moves along the track, the rotating plow knives penetrate and plow the earth. The plow knives are of any desired length to cause the earth to be plowed to the proper depth. As the machine moves around parallel adjacent arcuate sections 22a and 23a of the tracks, the speed of rotation of the motors 90 of the wheels at the corner C of the base frame is decreased relative to the speed of rotation of the motors 90 at the other two corners A and B of the machine by appropriately adjusting the rheostats 255 of these motors to permit the machine to move along such curved sections and to cause its side 110 to maintain a constant angle relative to the tracks at each point of its path of movement thereover. The speed of rotation of the motors 180 may be adjusted as desired to cause the earth to be fragmented or plowed to an appropriate fineness during the movement of the machine over the tract of land.

If row crops are planted on the track of land, the rows of crops are arranged parallel to the tracks so that the plow assemblies 140 may till or plow the earth between adjacent rows of crops as the machine moves thereover. In this case, the plow assemblies of each implement assembly section are rotated to positions wherein the plow knives work only the strips of earth between adjacent rows of crops. The pointed ends 305 or 305a of the housings provided by the angular sides 306 and 307 and 308 and 309 respectively, move forwardly between the rows of crops and point in the direction of movement of the machine so that any foliage of the rows of crops extending upwardly of the housings is cammed outwardly by the housings as they move therebetween.

It will be apparent that the plow assemblies will operate regardless of which direction the machine moves over the tracks 22 and 23, that is, from the outer periphery of the tract toward the center or from the center outwardly toward the outer periphery thereof. The extensions 40 and 41 of the base frame and the implement assembly sections 112 mounted thereon assure that all areas of the tract are worked by the plow assemblies mounted on the machine as the machine moves over the tract of land on the tracks it being apparent that if such extensions are not provided, substantially spiral strips of earth would not be plowed. During such movement, the springs 160 bias the housings 140 downwardly and at the same time permit limited upward movement of the housings in the event the fly wheels or plow knives encounter obstructions in their path of movement over and through the earth such as boulders or rocks to prevent damage to the plow assemblies.

When it is desired to remove or replace the plow assemblies pivoted on a particular implement section 112, the frame 113 of such assembly section may be pivotally upwardly about its hinges 114 by means of the rams 120 and may then be locked in such upper position by means of the pins 130. All sections 112, of course, may be moved upwardly to the upper inoperative positions on the base frame if the machine is to be moved from one location or tract to another or for transport from one location to another.

While particular earth working implements have been illustrated and described as being mounted on the frames 113 of the implement assembly sections 112, it will be apparent that other implements, for example, dispensing or spray devices for dispensing or spraying fertilizer or insecticides over the earth or the crops growing thereon may be mounted on the frames 113 in any suitable manner.

It will further be seen that the machine has a base frame supported on one track by a single wheel assembly and on the other track by two spaced wheel assemblies whereby the machine is movable over the substantially spirally arranged parallel tracks, the single wheel assembly moving over inner curved sections of one track as the other two wheel assemblies move over outer curved sections of the other track.

It will further be seen that while each of the wheel assemblies at the three corners A, B and C of the base frame of the machine have been provided with a drive means or motor, that if desired the wheel assembly at the inner corner C and only one of the wheel assemblies of the other two corners need be provided with such drive motors.

It will further be seen that the drive means or motors of the wheel assemblies are individually controllable whereby the speed of rotation of the wheels 52 on the two tracks may be varied as required during the movement thereof over curved sections of the tracks.

The foregoing description of the invention is explanatory only, and changes in the details of the construction illustrated may be made by those skilled in the art, within

What is claimed and desired to be secured by Letters Patent is:

1. A machine movable over a pair of parallel spaced tracks extending substantially spirally over a tract of land, said machine including: a substantially triangular base frame having three spaced corners; wheel means at each of said corners of said base frame supporting said base frame for movement on said tracks and over said tract of land, one said wheel means moving over one of said tracks and the other two of said wheel means moving over the other of said tracks; individual drive means for said wheel means at said corners of said frame; control means for individually varying the speed of rotation of each of said wheel means; and implement assembly sections connected to said base frame and extending across the path of movement of said machine over said tracks, each of said implement assembly sections comprising mount means mounted on said base frame and arranged substantially transversely of the path of movement of said machine over said tracks, and implement assemblies mounted on said mount means, said implement assemblies being moveable on said mount means for varying the width of the strips of earth extending parallel to said tracks worked by said implement assemblies as said machine moves over said tract of land on said tracks, said implement assembly sections being individually pivotally movable on said base frame between lower positions wherein said implement assemblies are in operative positions for working the earth and upper inoperative positions.

2. A machine movable over a pair of parallel spaced tracks extending substantially spirally over a tract of land, said machine including: a substantially triangular base frame having three spaced corners; wheel means at each of said corners of said base frame supporting said base frame for movement on said tracks and over said tract of land, one of said wheel means moving over one of said tracks and the other two of said wheel means moving over the other of said tracks; individual drive means for said wheel means at said corners of said frame; control means for individually varying the speed of rotation of each of said wheel means; and implement assembly sections connected to said base frame and extending across the path of movement of said machine over said tracks, each of said implement assembly sections comprising mount means mounted on said base frame and arranged substantially transversely of the path of movement of said machine over said tracks, and implement assemblies mounted on said mount means, said implement assemblies being movable on said mount means for varying the width of the strips of earth extending parallel to said tracks worked by said implement assemblies as said machine moves over said tract of land on said tracks, each of said implement assemblies including; a gear housing, a pair of earth working implements mounted on said housing engageable with the earth, means for rotating said housing about a vertical axis for moving said earth working implements between positions in alignment with the path of movement of said machine and positions extending substantially at an angle relative to said path of movement, said implement assembly sections being individually pivotally movable on said base frame between a lower position wherein said implement assemblies are in operative positions for working the earth and upper inoperative positions.

3. A machine movable over a pair of parallel spaced tracks extending substantially spirally over a tract of land, said machine including: a substantially triangular base frame having three sides extending between three corners; wheel means secured to said frame at said corners for supporting said base frame for movement on said tracks and over said tract of land; one of said wheel means moving over said one of said tracks and the other two of said wheel means moving over the other of said tracks; individual means for driving said wheel means to move said machine over said tracks, said base frame having extensions at two corners thereof extending in opposite directions outwardly of said pair of tracks; control means for individually varying the speed of rotation of each of said wheel means; and means for supporting implements mounted on said base frame and said extensions and extending across said tracks and across the path of movement of said frame and said extensions, said last mentioned means being pivotally mounted on said base frame and said extensions for movement between lower operative positions and upper inoperative positions.

4. A machine movable over a pair of parallel spaced tracks extending substantially spirally over a tract of land, said machine including: a substantially triangular base frame having three sides extending between three corners; wheel means secured to said frame at said corners for supporting said base frame for movement on said tracks and over said tract of land; one of said wheel means moving over said one of said tracks and the other two of said wheel means moving over the other said tracks; individual means for driving said wheel means to move said machine over said tracks, said individual means including variable speed motors, said base frame having extensions at two corners thereof extending in opposite directions outwardly of said pair of tracks; control means for individually varying the speed of rotation of each of wheel means; and means for supporting implements pivotally mounted on said base frame and said extensions and extending substantially perpendicularly across said tracks and across the path of movement of said frame and said extensions, said means for supporting implements being pivotally movable on said base frame between lower operative positions and upper inoperative positions.

5. The machine of claim 3 wherein each of said means for supporting implements includes mount means secured to said base frame and arranged substantially transversely along one side of said base frame and said extensions and arranged substantially transversely of the path of movement of said machine over said tracks; and implement assemblies mounted on said mount means, said implement assemblies movable on said mount means for varying the width of the strips of earth extending parallel to said tracks worked by said implement assemblies as said machine moves over said tract of land on said tracks.

6. The machine of claim 3 wherein each of said means for supporting implements includes mount means secured to said base frame and arranged substantially transversely along one side of said base frame and said extensions and arranged substantially transversely of the path of movement of said machine over said tracks; and implement assemblies mounted on said mount means, said implement assemblies being movable on said mount means for varying the width of the strips of earth extending parallel to said tracks worked by said implement assemblies as said machine moves over tract of land on said tracks, each of said implement assemblies including a gear housing, a pair of earth working implements mounted on said housing and engageable with the said earth, and means for rotating said housing about spaced vertical axes for moving said earth working implements between positions in alignment with each other and the path of movement of said machine and positions relative to each other at an angle relative to the said path of movement.

7. The machine of claim 3 wherein each of said means for supporting implements includes mount means secured to said base frame and arranged substantially transversely along one side of said base frame and said extensions and arranged substantially transversely of the path of movement of said machine over said tracks; and implement assemblies mounted on said mount means, said implement assemblies being movable on said mount means for varying the width of the strips of earth extending parallel to said tracks worked by said implement assemblies as said machine moves over said tract of land on said tracks, each of said means for supporting implements including a frame secured to said base frame and having a bottom plate; said implement assemblies being mounted on said base plate for rotation about spaced vertical axes; each of said implement assemblies including a housing and a pair of earth working implements mounted on said housing for rotation about spaced vertical axes.

8. The machine of claim 3 wherein each of said means for supporting implements includes mount means secured to said base frame and arranged substantially transversely along one side of said base frame and said extensions and arranged substantially transversely of the path of movement of said machine over said tracks; and implement assemblies mounted on said mount means, said implement assemblies being movable on said mount means for varying the width of the strips of earth extending parallel to said tracks worked by said implement assemblies as said machine moves over said tract of land on said tracks, each of said means for supporting implements including a frame secured to said base frame and having a bottom plate; said implement assemblies being mounted on said base plane for rotation about spaced vertical axes; each of said implement assemblies including a housing, a pair of earth working implements mounted on said housing for rotation about spaced vertical axes, and means for rotating said implement assemblies.

9. A machine movable over a pair of parallel spaced tracks extending substantially spirally over a tract of land, said machine including: a substantially triangular base frame having three sides extending between three corners; wheel means secured to said frame at said corners for supporting said base frame for movement on said tracks and over said tract of land, one of said wheel means moving over one of said tracks and the other two of said wheel means moving over the other of said tracks; individual means for driving said wheel means to move said machine over said tracks, said base frame having extensions at two corners thereof extending in opposite directions outwardly of said pair of tracks; control means for varying the speed of rotation of said wheel means; a plurality of supporting means for supporting implements mounted on said base frame and said extensions and extending across the path of movement of said base frame and said extensions, each of said supporting means including mount means secured to said base frame and extending substantially transversely of the path of movement of said machine over said tracks, said mount means including a frame secured to said base frame and having a bottom plate, a plurality of support means supported on said bottom plate for rotation about spaced vertical axes, and means mounted on said mount means for simultaneously rotating said support means; and an implement assembly mounted on each of said support means, each of said implement assemblies including a housing mounted on one of said support means; a pair of earth working implements mounted on said housing for rotation about spaced vertical axes, said implement assemblies being rotatable with said support means about said vertical axes for varying the width of the strips of earth extending parallel to said tracks worked by said earth working implements as said machine moves over said tract of land over said tracks.

10. The machine of claim 9 wherein each of said support means includes a support disc rotatably mounted on said bottom plate and said means for rotating said support means includes an adjusting bar, means pivotally connecting said support disc at locations spaced from said vertical axes about which said support means are rotatable, and means for moving said adjusting bar to cause said discs to rotate about said vertical axes, said housings of said implement assemblies being secured to said discs.

References Cited by the Examiner

UNITED STATES PATENTS

| | | | |
|---|---|---|---|
| 292,511 | 1/84 | Romaine | 172—59 X |
| 643,988 | 2/00 | Seaver | 212—15 |
| 2,366,598 | 1/45 | Crist | 105—179 |
| 3,006,485 | 10/61 | Martin | 212—15 X |

FOREIGN PATENTS

| | | |
|---|---|---|
| 529,074 | 6/54 | Belgium. |
| 643,897 | 5/28 | France. |
| 907,549 | 7/45 | France. |
| 926,291 | 4/47 | France. |
| 776,475 | 6/57 | Great Britain. |

ABRAHAM G. STONE, *Primary Examiner*